Patented Aug. 13, 1929.

1,724,270

UNITED STATES PATENT OFFICE.

HARRY L. FISHER, OF AKRON, OHIO, ASSIGNOR TO THE B. F. GOODRICH COMPANY, OF NEW YORK, N. Y., A CORPORATION OF NEW YORK.

AZO DYES FROM RUBBER DERIVATIVES.

No Drawing.    Application filed December 28, 1926.   Serial No. 157,626.

This invention relates to dyes prepared from rubber, more particularly colloidal dyes, and to a process for making such colloidal dyes.

The present invention is based on the discovery that the reaction product of rubber bromide and phenol is a phenol derivative of rubber containing free phenolic hydroxyl groups, rubber di-(hydroxyphenol), which is soluble in alkali and which can be coupled with diazotized aromatic amines to form colloidal dyes of commercial utility.

The following example is illustrative of a mode of procedure found to be satisfactory in carrying out the process of the present application. Rubber di-(hydroxyphenyl), prepared by reacting rubber bromide with phenol, or in any other suitable manner, is dissolved in a dilute sodium hydroxide solution, well cooled, and then treated with a cold solution of diazotized sulfanilic acid, the temperature of the mixture being kept cool, preferably close to 0° C. An alkaline solution deep maroon or red-brown in color results. The tinctorial powder recovered from this solution has very strong coloring properties.

Treatment of the alkaline solution with acid causes it to change to a yellow color, and further treatment with an alkali causes the solution to return to its original maroon color, showing that the dye is an "indicator" for acids and alkalies.

The dye is soluble in water and in an acid solution dyes wool a light brown or orange color, which is fast to washing and to sunlight.

In place of the diazotized sulfanilic acid of the above solution, diazotized aniline and diazotized benzidine may also be employed in the above procedure of the above example, the former producing a red-brown powder and the latter a dark brown powder, in both cases having strong coloring properties. Concentrated hydrochloric acid causes these dyes in each case to change to a deep purple.

It is to be understood that numerous variations and modifications of the specific procedure set forth above may be made without departing from the principles of the invention herein set forth.

I claim:

1. The process which comprises treating rubber di-(hydroxyphenyl) dissolved in an alkaline solution with a diazotized aromatic amine.

2. The process which comprises dissolving the reaction product of rubber bromide and phenol in an alkaline solution, and treating the solution thus formed with a diazotized aromatic amine.

3. The process which comprises treating rubber di-(hydroxyphenyl) dissolved in a dilute alkaline solution with a substance selected from a class comprising diazotized sulfanilic acid, diazotized aniline and diazotized benzidine.

4. The process which comprises dissolving the reaction product of rubber bromide and phenol in an alkaline solution, and treating the solution thus formed with a substance selected from a class comprising diazotized sulfanilic acid, diazotized aniline and diazotized benzidine.

5. A colloidal dye comprising the product of the reaction of rubber di-(hydroxyphenyl) and a diazotized aromatic amine.

6. A colloidal dye comprising the product of the reaction of rubber di-(hydroxyphenyl) and a substance selected from a class comprising diazotized sulfanilic acid, diazotized aniline and diazotized benzidine.

7. The process which comprises treating a diazotized aromatic amine with an alkaline solution of the reaction product of a phenol with a halogen derivative of rubber.

8. A colloidal dye comprising the reaction product of a diazotized aromatic amine and an alkaline solution of the reaction product of a phenol with a halogen derivative of rubber.

9. The process which comprises treating a diazotized aromatic amine with an alkaline solution of the reaction product of a hydroxy-substituted benzene with a halogen derivative of rubber.

10. The process which comprises treating a diazotized aromatic amine with an alkaline solution of the reaction product of a halogen derivative of rubber with a substance selected from a class comprising phenol and resorcinol.

In witness whereof I have hereunto set my hand this 20th day of November, 1926.

HARRY L. FISHER.